(12) United States Patent
Kendrick et al.

(10) Patent No.: US 6,302,015 B1
(45) Date of Patent: Oct. 16, 2001

(54) KNOTTER RESET ARM RELIEF MECHANISM

(75) Inventors: Patrick Kendrick; Edward W. Esau, both of Hesston, KS (US)

(73) Assignee: Hay & Forage Industries, Hesston, KS (US)

( * ) Notice: Subject to any disclaimer, the term of this patent is extended or adjusted under 35 U.S.C. 154(b) by 0 days.

(21) Appl. No.: 09/518,952

(22) Filed: Mar. 6, 2000

(51) Int. Cl.[7] .............................. A01F 15/14; B30B 15/12; B65B 13/18
(52) U.S. Cl. .................................. 100/4; 192/28
(58) Field of Search ................... 100/4, 8, 19 R, 100/20–23; 192/28

(56) References Cited

U.S. PATENT DOCUMENTS

| | | | |
|---|---|---|---|
| 2,620,724 | * 12/1952 | Berry ........................................ | 100/4 |
| 2,746,584 | * 5/1956 | Skromme ............................. | 100/4 X |
| 3,092,226 | * 6/1963 | Williamson ........................... | 100/4 X |
| 3,129,654 | * 4/1964 | Locker et al. ........................... | 100/4 |
| 3,366,036 | * 1/1968 | May et al. .............................. | 100/4 |
| 3,371,596 | * 3/1968 | Nelson .................................... | 100/4 |
| 3,448,681 | * 6/1969 | Nolt et al. ............................. | 100/4 X |
| 3,862,592 | * 1/1975 | Freeman .................................. | 100/4 |
| 4,083,441 | * 4/1978 | Young .................................... | 192/28 |
| 4,117,775 | * 10/1978 | White et al. ......................... | 100/19 R |
| 5,058,495 | * 10/1991 | Van Den Bossche et al. .......... | 100/4 |
| 5,156,085 | * 10/1992 | Bossche .................................... | 100/4 |
| 5,782,175 | 7/1998 | Schrag . | |
| 5,937,746 | * 8/1999 | Jonckheere et al. .................... | 100/4 |

FOREIGN PATENT DOCUMENTS

| | | | | |
|---|---|---|---|---|
| 223337-A1 | * | 6/1985 | (DE) ........................................ | 100/4 |
| 0429721-A1 | * | 6/1991 | (EP) ........................................ | 100/8 |

* cited by examiner

*Primary Examiner*—Stephen F. Gerrity
(74) *Attorney, Agent, or Firm*—Hovey, Williams, Timmons & Collins

(57) ABSTRACT

The dog clutch for a square baler is normally retained in a disengaged position as a continuously driven sprocket rotates around it during baling operations. When a retainer for the dog is released, the dog is released by the retainer and flips out to an engaged position so as to be driven through one knotter revolution by a driving lug on the rotating sprocket, whereupon it is reset by the retainer into its disengaged position. An external lobe on the rotating sprocket blocks releasing movement of the retainer if the driving lug of the sprocket is in the immediate vicinity of the dog, which could otherwise cause an insecure engagement of the lug with the dog. The dog-engaging seat on the retainer is spring-loaded to provide yieldable relief in the event binding starts to occur between the retainer and the dog.

11 Claims, 2 Drawing Sheets

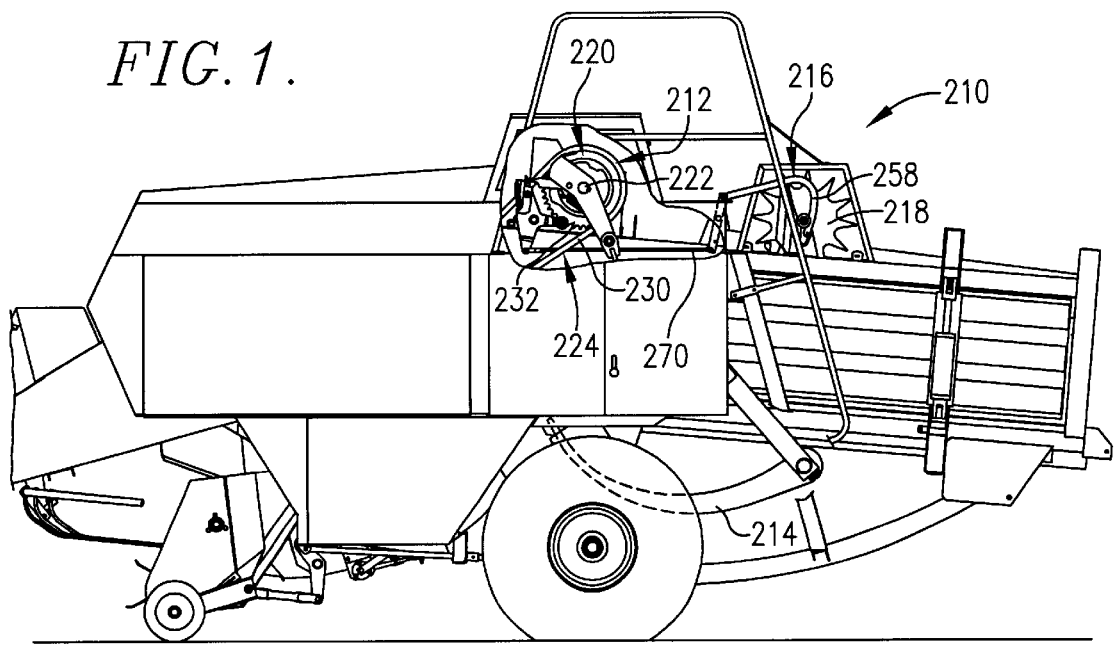
FIG. 1.
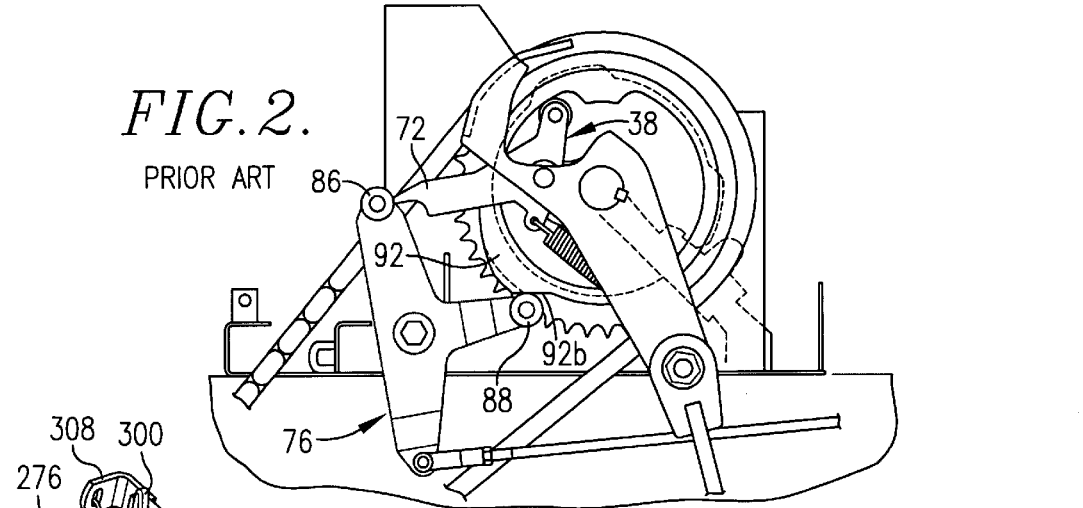
FIG. 2.
PRIOR ART
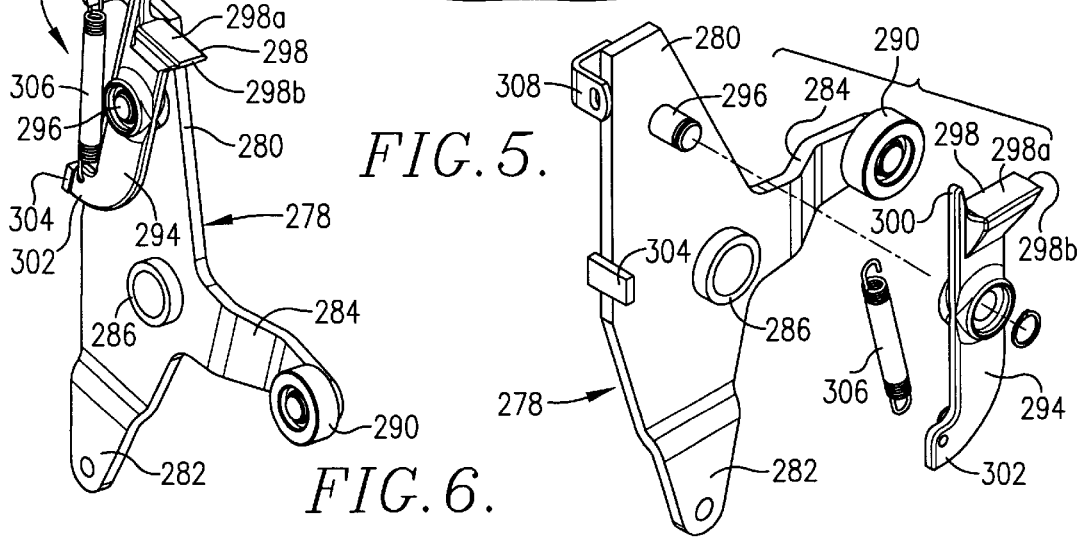
FIG. 5.
FIG. 6.

KNOTTER RESET ARM RELIEF MECHANISM

TECHNICAL FIELD

This invention relates to hay balers and, more particularly, to improvements associated with the clutch that activates the knotter and twine needles in such a baler.

BACKGROUND

U.S. Pat. No. 5,782,175 titled "Knotter Clutch Control for Square Balers" and assigned to the assignee of the present invention is directed to improvements that prevent the driven dog of the dog clutch on a baler from releasing to its actuated position for engagement with the driving lug of the clutch unless the lug is in a position where positive driving engagement between the lug and the dog is assured. The dog is normally maintained in its retracted position as the constantly moving sprocket having the driving lug mounted thereon rotates around the dog without making contact. The dog is held in the retracted position by a retainer that is released in response to the bale reaching a predetermined size, such release of the retainer permitting the dog to move out into its actuated position where it is picked up by the driving lug on the next cycle of revolution of the sprocket. A strategically located external lobe on the sprocket interacts with the retainer to prevent its release in the event the baler attempts to release the retainer when the lug is in the immediate vicinity of the dog, which release might cause the lug to only partially and temporarily catch the dog for driving the knotter through an operating cycle. By preventing the retainer from releasing unless the driving lug is spaced in its cycle from the dog, either on the approaching side or departing side thereof, positive interengagement between the lug and the dog can be achieved.

The external lobe also has the effect of resetting or tending to reset the retainer if the retainer has been released before the lobe reaches the reset roller. While this is of no particular consequence so long as the dog has been fully tripped and the operating lever associated therewith has moved past the retaining roller on the retainer, in some situations the roller may hang up on the tip of the lever as the external cam lobe tries to move the retainer in a resetting direction. Damage or breakage of components may result as the lobe attempts to swing the retainer inwardly at the same time the dog lever blocks such motion.

SUMMARY OF THE INVENTION

Accordingly, an important object of the present invention is to eliminate the potential for the retainer and dog to become jammed in a knotter clutch control of the type disclosed in the '175 patent. Such jamming problem is avoided in the present invention by providing a degree of spring relief between the dog and the retainer such that, in the event jamming starts to occur, the spring relief permits relative movement between the two components in such a direction that one or the other of the components can continue its movement in the appropriate direction.

In a preferred embodiment, such relief is provided by having the dog-engaging part of the retainer spring-loaded so that it can yield when untoward binding forces attempt to arise between the retainer and the dog. Preferably, the dog-engaging part of the retainer takes the form of a swingable member having a relatively flat seat for the outer end of the dog lever, such member being yieldably biased by a tension spring into a dog-blocking position on the supporting body of the retainer.

BRIEF DESCRIPTION OF THE DRAWINGS

FIG. 1 is a fragmentary side elevational view of a square baler incorporating an improved knotter clutch control constructed in accordance with the principles of the present invention;

FIG. 2 is an enlarged, fragmentary side elevational view of the prior art knotter clutch control as disclosed in U.S. Pat. No. 5,782,175, such view illustrating the binding problem that can sometimes arise;

FIG. 5 is an enlarged, exploded isometric view of a retainer constructed in accordance with the principles of the present invention; and FIG. 6 is an isometric assembly view of the retainer.

DETAILED DESCRIPTION

Figure 3:
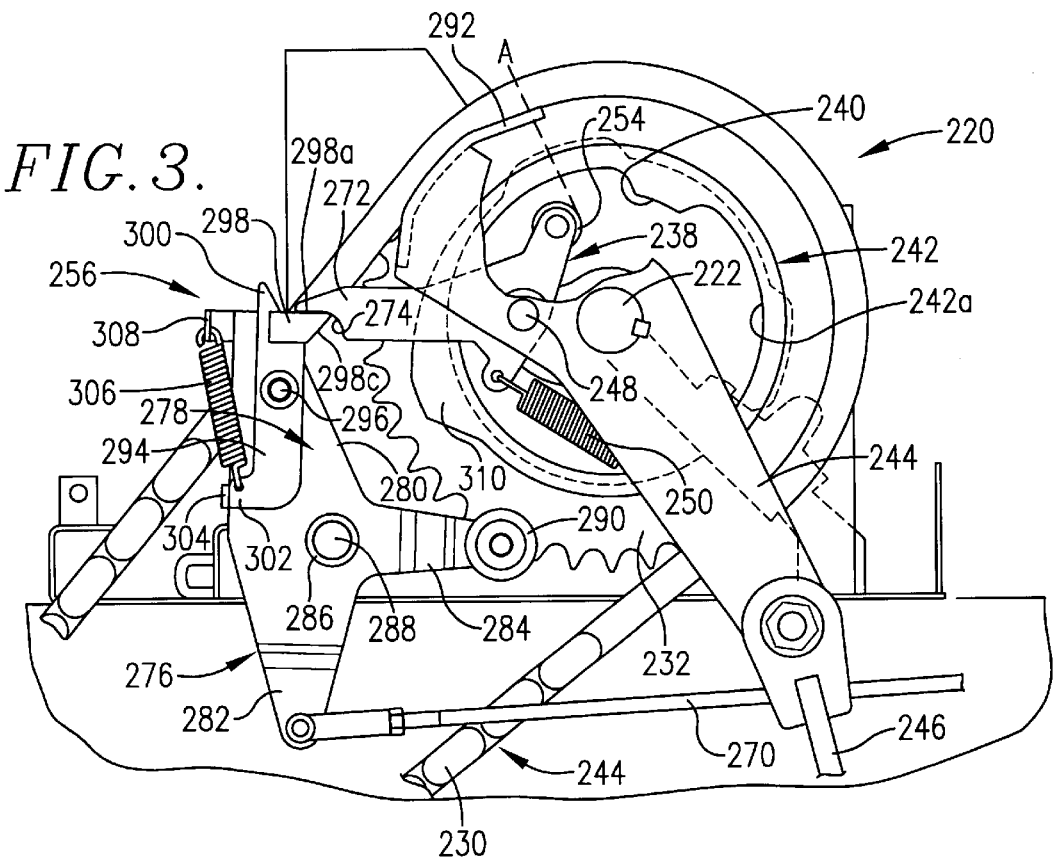
FIG. 3 is a further enlarged, fragmentary side elevational view of the improved knotter clutch control of the present invention illustrating the condition of components during normal operation when the clutch is in a disengaged condition and the retainer is holding the dog in its unactuated position.

The present invention comprises an improvement upon the invention disclosed and claimed in the above mentioned U.S. Pat. No. 5,782,175. Accordingly, for the sake of brevity, certain details disclosed with particularity in the '175 patent will not be repeated herein. Instead, U.S. Pat. No. 5,782,175 is hereby incorporated by reference into the present specification to the extent necessary for a full and complete understanding of the present invention.

The present invention is illustrated in connection with a large square baler 210 in FIG. 1. Such balers are typically capable of producing bales on the order of 1,500 to 2,000 pounds or more. However, it will be appreciated that the principles of this invention may also be applied to smaller balers, and such balers need not be of the "extrusion" type as illustrated in FIG. 1 in which new bales are progressively forced out the rear end of the baler through a restricted orifice.

The baler 210 has a series or "stack" of knotters 212 at the top of the baler which cooperate with twine needles 214 from time-to-time to place strands of twine around a finished bale. The knotters form a secure knot in the opposite ends of each twine strand and then cut the twine from the tied bale while retaining the free end of the twine for use in wrapping around the next bale. Generally speaking, a bale length sensor 216 including a star wheel 218 determines when a bale has reached full length, engages a clutch 220 associated with the stack of knotters 212, and causes the knotters 212 to actuate for one single revolution of a drive shaft 222. After each single revolution of the drive shaft 222, the clutch 220 is disengaged until the next bale reaches the proper length. During each knotter cycle, the needles 214 swing across the bale chamber located inside the baler 210 to present the ends of twine strands to the knotters 212.

The knotters 212 are supplied operating power through drive means such as a chain drive assembly 224. A component of the drive means, such as a sprocket 232, is constantly driven, so long as power is being supplied to the baler 210. A chain 230 of the drive assembly 224 is entrained around a sprocket 232 so as to drive the sprocket 232 around the axis of the knotter shaft 222. Although the sprocket 232 is continuously driven, the knotter shaft 222 does not rotate unless the clutch 220 is engaged.

The clutch 220 includes a dog 238 mounted on the knotter shaft 222, and a driving lug 240 mounted on the sprocket 232. The lug 240 is part of a circular cam ring 242 projecting outwardly from and integral with the outer face of the sprocket 232. The ring 242 is concentrically disposed about the axis of rotation of the knotter shaft 222 and has a radially inner, annular surface 242a that is totally concentric with the knotter shaft 222 except for the driving lug 240, where the surface 242a projects radially inwardly and is truncated to present the lug 240.

The clutch 220 further includes a crank arm 244 that is fixed intermediate its opposite ends to the knotter shaft 222 and extends entirely across the face of the sprocket 232. The crank arm 244 has its lower end operably connected with a linkage 246 that actuates the needles 214, while the opposite, upper end of the crank arm 244 carries the dog 238. Dog 238 is pivoted to the crank arm 244 by a pivot 248 and is swingable between a fully retracted position as illustrated in FIG. 3 which renders the clutch 220 disengaged and a fully extended position (not shown except with respect to the prior art in FIG. 2) corresponding to an engaged condition of the clutch 220.

A coil spring 250 forms an additional part of the clutch 220 and is connected between the crank arm 244 and a tab 252 on the dog 238 to yieldably bias dog 238 toward its engaged position. In such engaged position, a roller 254 at the outer end of the dog 238 rides along the inner annular surface 242a of cam ring 242. When dog 238 is in its engaged position, it is located within the circular path of travel of the moving lug 240, but when dog 238 is retracted, it clears dog 240 as dog 240 travels around the axis of knotter shaft 222.

Clutch 220 is engaged and disengaged by a control broadly denoted by the numeral 256. Bale length sensor 216 forms a part of such control and includes, in addition to the star wheel 218, an inverted, generally L-shaped arm 258 and linkage 270 extending forwardly from the arm 258. Further details of the construction and nature of operation of the length sensor 216 can be understood by reference to the '175 patent. In addition to bale length sensor 216, control 256 includes a lever 272 fixed to dog 238 and projecting radially outwardly from pivot 248. Lever 272 has a downwardly facing notch 274 in its outer end.

The control 256 further includes a releasable retainer 276 for releasably holding the dog 238 in its disengaged position of FIG. 3. Retainer 276 includes a generally T-shaped, generally flat support 278 having three legs 280, 282 and 284 that all project generally radially outwardly from a central hub 286 encircling a transverse pivot pin 288 on the baler. Legs 280 and 282 extend in opposite directions from one another, while leg 284 extends in a transverse direction relative to the legs 280,282. The lowermost end of leg 282 is pivotally connected to the linkage 270, while leg 284 carries at its outermost end a roller 290 that may be characterized as a "reset roller" for the retainer 256. Reset roller 290 is adapted to be engaged along its inner periphery by a reset flange 292 on the upper end of crank arm 244 during each knotting cycle.

The arm 280 pivotally supports a somewhat J-shaped member 294 on a transverse pivot 296 between opposite upper and lower ends of member 294. As shown in particular detail in FIGS. 5 and 6, member 294 includes a seat 298 adjacent its upper end that is adapted to underlie and releasably engage the lever 272 of dog 238 when retainer 276 is in its retaining position of FIG. 3. Seat 298 engages lever 272 at notch 274 at this time. Preferably seat 298 is shaped to provide an uppermost flat face 298a and an outermost edge 298b. Furthermore, seat 298 is undercut below edge 298b so as to present a receding, inclined surface 298c. A tang 300 at the rear of seat 298 projects above the flat surface 298a to define the upper extremity of the member 294, while a tail 302 projects laterally from the bottom end of the member 294 generally away from the clutch 220.

The support 278 has a lower stop 304 disposed for abutting engagement with the tail 302 of member 294 so as to limit clockwise pivoting movement of member 294 about pivot 296. Stop 304 is so located that when tail 302 is in engagement therewith, seat 298 is in a blocking position with respect to lever 272 of dog 238 when retainer 276 is in its retaining position of FIG. 3. Member 294 is yieldably biased into abutting engagement with stop 304 by a coiled tension spring 306 connected between the tail 302 of member 294 and a generally L-shaped tab 308 projecting rearwardly from the upper end of the arm 280 of support 278. Tab 308 also serves as a stop disposed for engagement with the tang 300 after a certain amount of counterclockwise rotation of member 294 from the FIG. 3 position such as, for example, approximately thirty degrees. In its capacity as a stop, tab 308 comes into play in the event that spring 306 breaks, in which event it is desirable to keep the lower end of member 294 from rotating counterclockwise to such an extent that it comes into the path of travel of lever 272 of dog 238 as dog 238 rotates through a knotting cycle. Member 294, pivot 296 and relief spring 306 may collectively be referred to as relief mechanism for allowing seat 298 to yieldably shift out of its blocking position of FIG. 3 should the need arise as discussed below.

Control 256 for clutch 220 further includes an external cam lobe 310 on the outside surface of ring 242. The high spot on lobe 310 is located approximately 130° from driving lug 240 in the counterclockwise direction. When driving lug 240 is at pickup point A in the knotting cycle of revolution, lobe 310 is directly under roller 290 so as to preclude release of retainer 256.

Operation

As a bale is being formed within the baler 210, the chain assembly 224 is continuously operating such that sprocket 232 is continuously rotating. Driving lug 240 is thus also continuously moving in a circular path of travel about the axis of knotter shaft 222 in a counterclockwise direction. However, as long as dog 238 remains in its disengaged position of FIG. 3, driving lug 240 misses roller 254 of dog 238 during each revolution and thus maintains clutch 220 in a disengaged condition. Seat 298 of retainer 276 remains securely beneath lever 272 of dog 238 at this time, assuring that dog 238 does not flip out to its engaged position.

Figure 4:
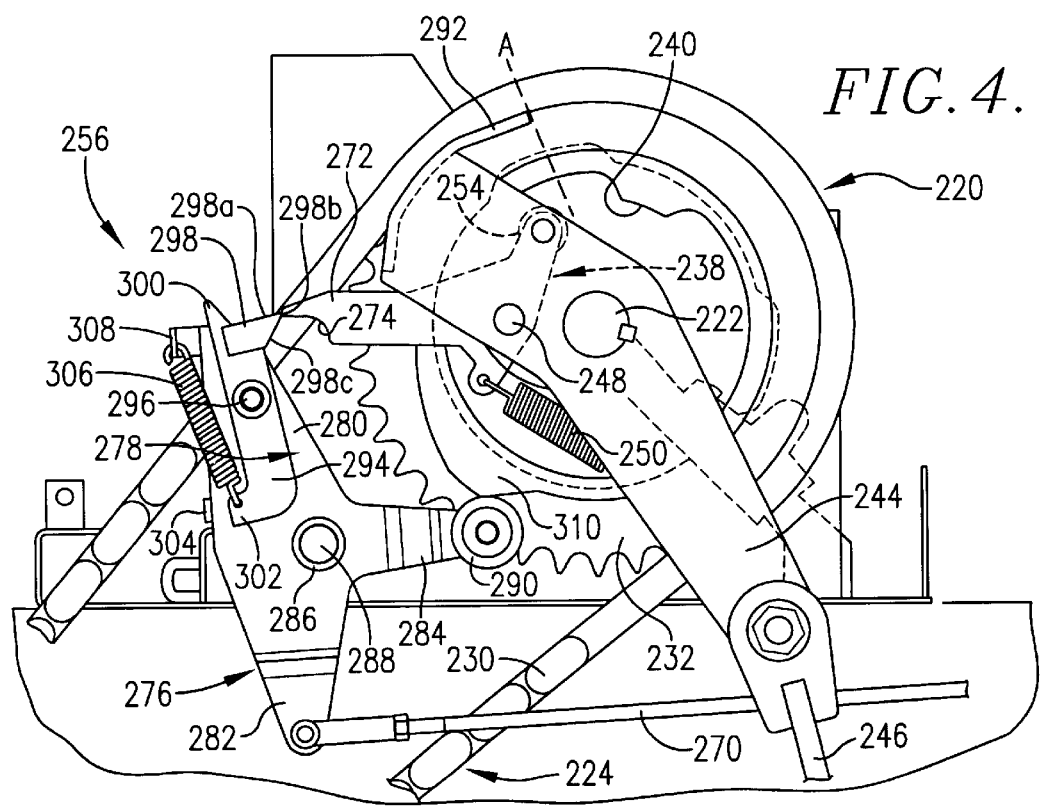
FIG. 4 is a side elevational view similar to FIG. 3 but illustrating how the retainer of the present invention has the capability of relieving potential jamming forces between the retainer and the clutch dog.

When the bale length sensor 216 trips, and assuming driving lug 240 is spaced from dog 238 rather than in the immediate vicinity, linkage 270 pulls the leg 282 of retainer 276 rightwardly viewing FIGS. 3 and 4 so as to rotate the retainer in a counterclockwise direction, displacing the seat 298 leftwardly out from under lever 272 of dog 238. This allows spring 250 to snap roller 254 out into contacting engagement with the inner surface 242a of cam ring 242 so as to be within the path of travel of driving lug 240. Therefore, when driving lug 240 reaches pickup point A, it engages roller 254 of lug 238 and pushes the entire knotter shaft 222, dog 238 and crank arm 244 in a counterclockwise direction through one complete 360° operating cycle. During such cycle, the reset cam flange 292 engages the reset roller 290 and resets retainer 276 in a clockwise direction back into its retaining position so as to be disposed to engage lever 272 of dog 238 when it returns to pickup point A. This causes dog 238 to be rotated about pivot 248 to its disengaged position while driving lug 240 continues along its path of travel.

In the event that bale length sensor 216 attempts to release retainer 276 when driving lug 240 is in the immediate vicinity of dog 238, such release is prevented due to the presence of the external cam lug 310 which is directly under the roller 290 of retainer 276 at such time. External lug 310 thus prevents retainer 276 from rocking back in a counterclockwise direction as long as it is under roller 290. Once external lug 310 has passed by roller 290, retainer 276 is free to release, thus tripping dog 238 to its engaged position so that driving lug 240 can pick up roller 254 of dog 238 when lug 240 next reaches pickup point A.

Normally, conditions are such that once dog 238 is engaged, lever 272 thereof is rotated counterclockwise about pivot 248 a sufficient extent that seat 298 will swing in behind lever 272 during any resetting movement of retainer 276 such as might occur if the external lug 310 were to engage the outside edge of the roller 290. However, if for some reason, such as tolerance build-up, timing of the knotter trip, or other causes, the seat 298 does not clear the lever 272 when external cam 310 tends to swing retainer 276 back toward its retaining position as illustrated in FIG. 4, relief spring 306 will yield to the extent necessary to accommodate that situation. Once driving lug 240 then picks up dog 238 and starts to move it counterclockwise, lever 272 will disengage from seat 298, allowing relief spring 306 to return seat 298 to its blocking position with tail 302 engaged against stop 304. Thus, binding between the retainer 276 and dog 38 is avoided, which prevents damage to operating components and assures more uniform bale length.

FIG. 2 illustrates the binding problem that could sometimes occur with the prior arrangement in U.S. Pat. No. 5,782,175. As the roller 88 starts to roll up the ramp 92b of external lobe 92, retainer 76 is cammed inwardly. Instead of roller 86 passing to the backside of lever 72, however, it may directly strike the tip of lever 72. As roller 88 continues up the ramp 92b, binding occurs and breakage may result. With the spring relief now provided in the retainer 276 of the present invention, however, this undesirable situation cannot occur.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. In a square baler having an intermittently operated knotter shaft that becomes operably connected with a continuously rotating drive component during each knotter cycle, the improvement comprising:

a clutch including
   a dog mounted for rotation with the knotter shaft,
   a driving lug mounted on the component and engageable with the dog at a pickup point on the path of travel of the lug for transferring driving power from the component to the knotter shaft when the lug is engaged with the dog,
   a spring yieldly urging the dog toward an engaged position in which the dog is disposed in the path of travel of the lug so that the lug engages the dog when the lug reaches the pickup point on its path of travel, thereby placing the clutch in an engaged condition,
   said dog being holdable in a retracted position corresponding to a disengaged condition of the clutch in which the dog is out of the path of travel of the lug so that the lug passes by the dog when the lug reaches the pickup point; and
a control for the clutch including
   a releasable retainer for releasably holding the dog in said retracted position against the bias of said spring,
   a reset device rotatable with the dog when the clutch is engaged and disposed for resetting the released retainer during each knotting cycle such that the retainer is enabled to contact the dog and return the dog to its retracted position when the dog and lug arrive back at the pickup point after completing the knotter cycle,
   a cam on the component,
   a follower on the retainer,
   said cam and said follower being so disposed that the cam blocks release of the retainer when the lug is at the pickup point,
   said releasable retainer including a support movable into and out of a retaining position and a member mounted on said support in a blocking position for blocking movement of the dog to its engaged position when the support is in its retaining position,
   said member being shiftable relative to the support out of said blocking position,
   said retainer further including a relief spring biasing the member toward its blocking position but allowing the member to be forcibly shifted away from said blocking position if necessary to allow the dog to clear the member during rotation of the dog with the component.

2. In a baler as claimed in claim 1,
said member being pivotally mounted on said support such that said shifting of the member is carried out in a pivoting motion.

3. In a baler as claimed in claim 1,
said dog including a lever having an outer free end,
said member including an outwardly projecting seat adapted to underlie said outer end of the lever when the member is in its retaining position,
said seat having an outermost edge generally facing the knotter shaft and being undercut beneath the edge to present a receding lower surface.

4. In a baler as claimed in claim 3,
said member being pivotally mounted on said support such that said shifting of the member is carried out in a pivoting motion.

5. In a baler as claimed in claim 4,
said support including a stop disposed to preclude pivoting of the member toward the dog under the urging of said relief spring beyond said blocking position of the member.

6. In a baler as claimed in claim 5, said member having a pair of opposite ends, said member being pivotally attached to the support at a point between said opposite ends, said seat being disposed at one end of the member, and said spring being connected to the opposite end of the member.

7. In a baler as claimed in claim 6, said stop being disposed to engage said opposite end of the member.

8. In a baler as claimed in claim 7, said support having a second stop disposed to engage said one end of the member after a certain amount of pivoting of the member in a direction to move the seat away from the lever of the dog, said second stop being located at such a position as to prevent said opposite end of the member from swinging into the path of travel of the lever of the dog as the dog rotates with the knotter shaft.

9. In a baler as claimed in claim 8, said relief spring comprising a tension spring that stretches as the member is shifted away from its retaining position, said relief spring being connected between said second stop and said opposite end of the member.

10. In a baler as claimed in claim 1, said component comprising a sprocket.

11. In a baler as claimed in claim 1, said cam comprising a lobe on an outer periphery of the driving component.

\* \* \* \* \*